(12) United States Patent
Gogotsi et al.

(10) Patent No.: US 8,498,097 B2
(45) Date of Patent: Jul. 30, 2013

(54) SUPERCAPACITOR COMPOSITIONS, DEVICES AND RELATED METHODS

(75) Inventors: Yury Gogotsi, Warminster, PA (US); Patrice Simon, Toulouse (FR); Celine Largeot, Chorey les Beavne (FR); Cristelle Portet, Grenoble (FR); John Chmiola, Berkeley, CA (US); Pierre-Louis Taberna, Escalquens (FR)

(73) Assignee: Drexel University, Philadelphia, PA (US)

( * ) Notice: Subject to any disclaimer, the term of this patent is extended or adjusted under 35 U.S.C. 154(b) by 122 days.

(21) Appl. No.: 12/864,774

(22) PCT Filed: Jan. 30, 2009

(86) PCT No.: PCT/US2009/032542
§ 371 (c)(1),
(2), (4) Date: Nov. 30, 2010

(87) PCT Pub. No.: WO2009/123784
PCT Pub. Date: Oct. 8, 2009

(65) Prior Publication Data
US 2011/0122542 A1    May 26, 2011

Related U.S. Application Data

(60) Provisional application No. 61/025,058, filed on Jan. 31, 2008.

(51) Int. Cl.
*H01G 9/00* (2006.01)
*H01G 9/02* (2006.01)

(52) U.S. Cl.
USPC .......................... 361/502; 361/504; 29/25.03

(58) Field of Classification Search
None
See application file for complete search history.

(56) References Cited

U.S. PATENT DOCUMENTS

| | | | |
|---|---|---|---|
| 7,998,615 B2 * | 8/2011 | Matsui et al. | 429/199 |
| 2002/0097549 A1 * | 7/2002 | Maletin et al. | 361/502 |
| 2005/0158623 A1 | 7/2005 | Matsui et al. | |
| 2008/0151472 A1 * | 6/2008 | Maletin et al. | 361/502 |
| 2008/0192407 A1 * | 8/2008 | Lu et al. | 361/502 |
| 2008/0204972 A1 * | 8/2008 | Yoshida et al. | 361/502 |

FOREIGN PATENT DOCUMENTS

WO    WO2005/007566    *    1/2005

OTHER PUBLICATIONS

Chmiola et al., Anomalous Increase in Carbon Capacitance at Pore Sizes Less than 1 Nanometer, Sep. 22, 2006, Science, vol. 313, pp. 1760-1763.*

Arulepp et al., the Advanced Carbide-Derived Carbon Based Capacitor, 2006, Journal of Power Sciences, vol. 162, pp. 1460-1466.*

Ania, C.O. et al., "Solvent-free ionic liquids as in situ probes for assessing the effect of ion size on the performance of electrical double layer capacitors" Carbon, 44, 2006, 3113-3148.

Arulepp, M. et al., "The Advanced Carbide-Derived Carbon Based Supercapacitor," *Journal of Power Sources*, 162, 2006, 1460-1466.

(Continued)

*Primary Examiner* — Jayprakash N Gandhi
*Assistant Examiner* — Dion Ferguson
(74) *Attorney, Agent, or Firm* — Woodcock Washburn, LLP

(57) ABSTRACT

Disclosed are supercapacitor materials comprising compositions having pores that are optimally sized to maximize capacitance. Also disclosed are related methods for fabricating such supercapacitors.

60 Claims, 5 Drawing Sheets

OTHER PUBLICATIONS

Balducci, A., et al. "High-Temperature Carbon-Carbon Supercapacitor Using Ionic Liquid As Electrolyte," *J. Power Sources*, 2007, 165 (2) 922-927.

Chen R.; Wu, L; Li, B.; Xu, X; Qiu, S., "Novel Binary Room-Temperature Complex System Based on LiTFSI and 2-Oxazolidinone and Its Characterization as Electrolyte," *J. Phys. Chem. C.*, 2007 (111), 5184-5194.

Chmiola, J. et al., "Anomalous Increase in Carbon Capacitance at Pore Sizes Less Than 1 Nanometer," Sep. 22, 2006, vol. 313, 1760-1763.

Gogotsi, Y., "Nanoporous Carbide-Derived Carbon With Tubable Pore Size," *Nature Materials*, 2, 2003, 591-594.

J. Rouquerol. D. Avnir, CW Fairbridge, DH Ever-ett. JH Haynes, N. Pernicone, J. DF Ramsey, KS W. Sing. KK Unger, *Pure Appl. Chem.*, 1994, (66), 1739-1758.

Lazzari, M. et al., "Capacitance response of carbons in solvent-free ionic liquid electrolytes," *Electrochemistry Communications*, 2007, 9, 1567-1572.

P.I. Ravikovitch, A. Neimark, "Characterization of nanoporous materials from adsorption and desorption isotherms" *Colloids and Surfaces A: Physicochemical and Engineering Aspects* vols. 187-188, Aug. 31, 2001, pp. 11-21.

P.L. Taberna, et al., "Electrochemical Characteristics and Impedance Spectroscopy Studies of Carbon-Carbon Supercapacitors", Journal of the Electrochemical Society, 2003, 150, A292-A300.

Renjie Chen, Feng Wu, Bin Xu, Li Li, Xinping Qiu, and Shi Chen, "Binary Complex Electrolytes Based on LiX [ X = N ( $SO_2CF_3$ )2-, $CF_3SO_3$-, $ClO_4$-]-Acetamide for Electric Double Layer Capacitors," J. Electrochem. Soc. 2007 154(7): A703-A708.

Zhang, H.; Cao, G.; Yang, Y.; Gu, Zu; *Carbon* 2007, "Capacitive performance of an ultralong aligned carbon nanotube electrode in an ionic liquid at 60° C.", published online doi:10.1016/j.carbon.2007. 10.023—available online Oct. 30, 2007, 30-34.

\* cited by examiner

SUPERCAPACITOR COMPOSITIONS, DEVICES AND RELATED METHODS

CROSS-REFERENCE TO RELATED APPLICATIONS

This application is the National Stage of International Application No. PCT/US2009/032542, filed Jan. 30, 2009, which claims the benefit of U.S. Provisional Application No. 60/025,058 filed Jan. 31, 2008, the disclosures of which are incorporated herein by reference in their entireties.

STATEMENT OF GOVERNMENT INTEREST

The U.S. Government has certain rights in the present invention. This work was partially supported by Department of Energy grant DE-FG02-07ER46473 and the National Science Foundation Grant No. DGE-0221664.

FIELD OF THE INVENTION

The present invention pertains to the field of nanoporous materials. The present invention also pertains to the field of electric capacitors.

BACKGROUND OF THE INVENTION

Electric Double Layer Capacitors (EDLC), also known as supercapacitors or ultracapacitors, have received much attention recently because of their power delivery performance that perfectly fills the gap between dielectric capacitors and traditional batteries. With the growing development of renewable energy sources as well as Hybrid Electric Vehicles (HEV), where peak power will be needed, these systems may play an important role in complementing or replacing batteries in the energy storage field.

The most advanced devices, e.g. carbon-based supercapacitors, store the energy through reversible ion adsorption on high specific surface area (SSA) carbons at the carbon/electrolyte interface. This surface storage explains the high power capability of these systems. Moreover, because it is believed that there are no Faradic reactions involved in the charge storage mechanism, EDLCs can sustain hundreds of thousands cycles without any noticeable performance change. However, as a consequence of the reversible electrostatic surface charging, these systems suffer from limited energy density. Ongoing EDLC research is largely focused on increasing their energy performance and temperature limit. For example, Carbide-Derived Carbon (CDC) materials seem to defy conventional wisdom about inaccessibility of small pores to solvated ions, tailored sub-nanoporous materials exhibit very high capacitance in an acetonitrile-based organic electrolyte, with a volumetric energy about twice as high as standard, commercial activated carbons. An Ionic Liquid (IL) electrolyte was used to study the capacitive behavior of CDCs with controlled and tunable pore size just below and above the ion size. And TiC-CDCs have recently demonstrated great potential for controlling pore size in supercapacitor materials.

Despite the advances in supercapacitor materials, there is nevertheless a need for a material of controllable porosity capable of equaling or surpassing the energy storage potential of existing supercapacitors. There is also an attendant need for methods for fabricating such supercapacitor materials.

SUMMARY OF THE INVENTION

To meet the challenges of providing enhanced supercapacitor materials, the present invention provides, inter alia, a composition, comprising a nanoporous material and a plurality of ions, the nanoporous material being characterized as comprising a plurality of nanopores having an average characteristic cross-sectional dimension in the range of from about 0.1 nm to about 3 nm, and the difference between the average characteristic cross-sectional dimension of the nanopores and the average cross-sectional dimension of the plurality of ions being in the range of less than about 0.05 nm.

The present invention also provides an energy storage device, comprising a composition disposed between one or more electrodes, the composition comprising a nanoporous material and a plurality of ions, the nanoporous material characterized as having a plurality of nanopores having an average characteristic cross-sectional dimension in the range of from about 0.1 nm to about 3 nm, and the average characteristic cross-sectional dimension of the nanopores being within about 0.05 nm of the average cross-sectional dimension of the plurality of ions.

Further disclosed are methods for fabricating a supercapacitor, comprising contacting a nanoporous composition comprising a plurality of nanopores with a plurality of ions, the difference between the average characteristic cross-sectional dimension of the nanopores and the average cross-sectional dimension of the plurality of ions being less than about 0.05 nm, the ions being chosen such that at least one ion is capable of residing at least partially within one or more pores of the nanoporous composition.

The general description and the following detailed description are exemplary and explanatory only and are not restrictive of the invention, as defined in the appended claims. Other aspects of the present invention will be apparent to those skilled in the art in view of the detailed description of the invention as provided herein.

BRIEF DESCRIPTION OF THE DRAWINGS

The summary, as well as the following detailed description, is further understood when read in conjunction with the appended drawings. For the purpose of illustrating the invention, there are shown in the drawings exemplary embodiments of the invention; however, the invention is not limited to the specific methods, compositions, and devices disclosed. In addition, the drawings are not necessarily drawn to scale. In the drawings.

DETAILED DESCRIPTION OF THE INVENTION

Figure 1:
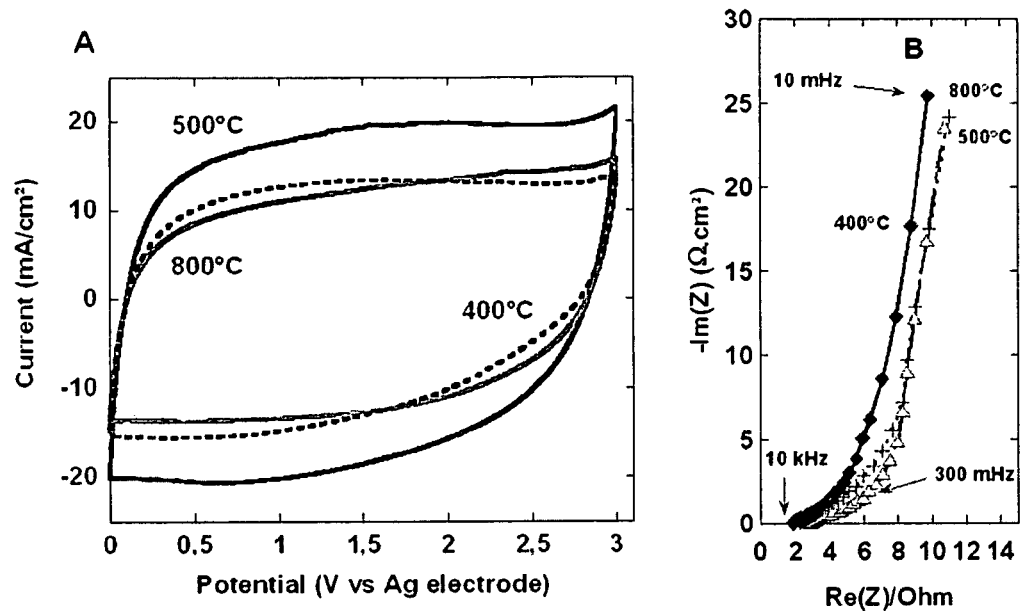
FIG. 1 illustrates cyclic voltammetry at 20 mV/s (A) and Electrochemical Impedance Spectroscopy (EIS) plots (B) between 10 kHz and 10 mHz for the 400, 500 and 800° C. samples, in EMI-TFSI electrolyte at 60° C.

The present invention may be understood more readily by reference to the following detailed description taken in connection with the accompanying figures and examples, which form a part of this disclosure. It is to be understood that this invention is not limited to the specific devices, methods, applications, conditions or parameters described and/or shown herein, and that the terminology used herein is for the purpose of describing particular embodiments by way of example only and is not intended to be limiting of the claimed invention. Also, as used in the specification including the appended claims, the singular forms "a," "an," and "the" include the plural, and reference to a particular numerical value includes at least that particular value, unless the context clearly dictates otherwise. The term "plurality", as used herein, means more than one. When a range of values is expressed, another embodiment includes from the one particular value and/or to the other particular value. Similarly, when values are expressed as approximations, by use of the antecedent "about," it will be understood that the particular value forms another embodiment. All ranges are inclusive and combinable.

It is to be appreciated that certain features of the invention which are, for clarity, described herein in the context of separate embodiments, may also be provided in combination in a single embodiment. Conversely, various features of the invention that are, for brevity, described in the context of a single embodiment, may also be provided separately or in any subcombination. Further, reference to values stated in ranges include each and every value within that range.

In a first aspect, the present invention provides compositions. These compositions comprise a nanoporous material and a plurality of ions, the nanoporous material being characterized as comprising a plurality of nanopores having an average characteristic cross-sectional dimension in the range of from about 0.1 nm to about 3 nm, and the difference between the average characteristic cross-sectional dimension of the nanopores and the average cross-sectional dimension of the plurality of ions being in the range of less than about 0.05 nm.

In some embodiments, discussed in greater detail elsewhere herein, the nanoporous material is capable of functioning as an electrode. The nanoporous material is also suitably capable of being applied to a conductive material so as to comprise an electrode.

Nanoporous materials suitable for the present invention include materials that comprise an essentially unimodal distribution of pore size. Suitable materials also, depending on the user's needs, may have a bi-, tri-, or multi-modal distribution of pore sizes.

As a non-limiting example, in some embodiments, the composition may include two or more ion species of differing—i.e., larger and smaller—cross-sectional dimensions. In these embodiments, the nanoporous material is chosen or synthesized such that the material includes pores of differing sizes such that there are pores of a diameter within 0.05 nm of the larger ion cross-sectional dimension and pores of a diameter within about 0.05 nm of the smaller ion cross-sectional dimension. Some embodiments may include two, three, or more differently-sized ions, and such embodiments preferably include pores within 0.05 nm in size of each of the different ion sizes. In some embodiments, the difference between the average pore size of the pores and the average cross-sectional dimension of the ions is about 0.03 nm.

Ion species used in the composition are suitably chosen such that the ions are capable of remaining stable when subjected to a voltage. As discussed elsewhere herein, certain devices may be assembled by application of electric charge to ions, and it is preferable that the ions remain stable when subjected to such a charge.

Some embodiments of the present invention include ions present in an electrolyte, which electrolyte is suitably an ionic liquid. The ionic liquid typically includes cations of ethylmethylimmidazolium, tetraalkylammonium, dialkylimidazolium, trialkylimidazolium, tetraalkylimidazolium, alkylpyridinium, dialkylpyrrolidinium, dialkylpiperidinium, tetraalkylphosphonium, trialkylsulfonium, or any combination thereof. Suitably ionic liquids also include anions of $BF_4$, $B(CN)_4$, $n-C_3F_7BF_3$, $CH_3BF_3$, $CH_2CHBF_3$, $CF_3BF_3$, $C_2F_5BF_3$, $n-C_4F_9BF_3$, $PF_6$, $CF_3CO_2$, $CF_3SO_3$, $N(SO_2CF_3)_2$, $N(COCF_3)(SO_2CF_3)$, $N(SO_2F)_2$, $N(CN)_2$, $C(CN)_3$, SCN, SeCN, $CuCl_2$, $AlCl_4$, spyro-bipyrrolidinium, or any combination thereof. Ethyl-Methyl Immidazolium-Trifluoromethane-Sulfonyl Imide is a particularly suitable ionic liquid.

In other embodiments, the ions are disposed in a solvent. Ion species suitable for such embodiments include tetraalkylammonium, tetrakis(dialkylamino) phosphonium, N,N-dialkyl-1,4-diazabicyclo[2.2.2]octanediium and solvents of acetonitrile, butyronitrile, gamma-butyrolactone, propylene carbonate, N,N-dimethylformamide, 1-methyl-2-pyrrolidinone, dimethoxyethane, methyl ethyl ketone, tetrahydrofuran, or any combination thereof.

Ions suitably have a cross-sectional dimension in the range of from about 0.1 nm to about 3 nm. But ions may also have a cross-sectional dimension in the range of from about 0.5 nm to about 2 nm, or even in the range of from about 1 nm to about 1.5 nm.

Nanoporous materials suitable for the present invention preferably comprise carbon. Carbide-derived carbons ("CDCs") are considered suitable nanoporous materials, and titanium-carbon carbide derived carbons are considered especially suitable. The nanoporous material is suitably substantially free of halogens.

As discussed elsewhere herein, nanopores suitably are characterized as having a characteristic cross-sectional dimension in the range of from about 0.1 nm to about 3 nm. Depending on the user's needs, nanopores having a characteristic cross-sectional dimension in the range of from about 0.2 nm to about 2.5 nm, or in the range of from about 0.5 nm to about 2.0 nm, or in the range of from about 0.7 nm to about 1.0 nm, are all considered suitable.

Nanoporous materials suitable for use in the present invention can have a specific surface area, as determined by the Brunauer Emmett Teller method, in the range of from about 800 $m^2/g$ to about 3000 $m^2/g$, or in the range of from about 1000 $m^2/g$ to about 2000 $m^2/g$. The materials also, in some configurations, have an average pore volume in the range of from about 0.4 cc/g to about 0.9 cc/g.

Compositions according to the present invention possess a normalized capacitance of greater than about 6 µF/cm2, or greater than about 8 µF/cm2, or even greater than about 12 µF/cm2. Compositions according to the present invention can also possess a specific capacitance of greater than about 90 F/g, or greater than about 100 F/g, or even greater than about 120 F/g, or even greater than about 140 F/g.

The compositions of the present invention also include, in some embodiments, a binder capable of fixing the composition into a cohesive form. Such binders may be adhesives, polymers, glues, tackifiers, and the like. Binders used in the present invention preferably exert little impact on the ability of the disclosed compositions to acquire, store, or release electrical charge.

In some embodiments, one or more of the plurality of ions is characterized as residing at least partially within one or more pores of the composition. As discussed elsewhere herein—and without being bound to any particular theory of operation—the ability of ions to enter at least partially into the pores is of importance to the present invention.

In another aspect, the present invention provides energy storage devices. These devices include a composition disposed between one or more electrodes, the composition comprising a nanoporous material and a plurality of ions. Nanoporous materials characterized as having a plurality of nanopores having an average characteristic cross-sectional dimension in the range of from about 0.1 nm to about 3 nm are considered particularly suitable for the present invention. The average characteristic cross-sectional dimension of the nanopores is also suitably within about 0.05 nm of the average cross-sectional dimension of the plurality of ions.

The nanoporous composition comprises carbon, a carbide-derived carbon, or any combination thereof, as described elsewhere herein. Carbide-derived carbons are considered particularly suitable, but other nanoporous materials may be used in the disclosed energy storage devices.

The plurality of pores suitably has an average cross-sectional dimension in the range of from about 0.1 nm to about 3 nm. As described elsewhere herein, the materials may include a uni- or multi-modal distribution of pores, depending on the user's needs and the ions included in the device.

The compositions suitably include one or more binders, such binders being capable of maintaining the nanoporous material in a cohesive form. Binders may, as discussed elsewhere herein, comprise adhesives, glues, polymers, tackifiers, and the like. Suitable binders characterized as being essentially electrochemically inert are considered especially suitable, as are binders that are essentially insoluble in an electrolyte solution in which ions may be disposed. Suitable binder polymers include polytetrafluoroethylene, polyvinylidene fluoride, or any combination thereof, and the like. Accordingly, certain embodiments may include a nanoporous compound held together by a binder, which bound composition is then coated onto or otherwise disposed on an electrode.

The ions of the energy storage device may be disposed in an ionic liquid; suitable liquids will be known to those of ordinary skill in the art. Suitable ions include cations of ethylmethylimmidazolium. tetraalkylammonium, di alkylimidazolium, trialkylimidazolium, tetraalkylimidazolium. alkylpyridinium. dialkylpyrrolidinium. dialkylpiperidinium. tetraalkylphosphonium. trialkylsulfonium. and anions of, but not limited to: $BF_4$, $B(CN)_4$, $n\text{-}C_3F_7BF_3$, $CH_3BF_3$, $CH_2CHBF_3$, $CF_3BF_3$, $C_2F_5BF_3$, $n\text{-}C_4F_9BF_3$, $PF_6$, $CF_3CO_2$, $CF_3SO_3$, $N(SO_2CF_3)_2$, $N(COCF_3)(SO_2CF_3)$, $N(SO_2F)_2$ $N(CN)_2$, $C(CN)_3$, SCN, SeCN, $CuCl_2$, $AlCl_4$, spyro-bipyrrolidinium, or any combination thereof. Other ions are described elsewhere herein. Preferably, at least one of the plurality of ions resides at least partially within a pore of the nanoporous composition.

The energy storage devices include two or more electrodes. Such electrodes preferably reside opposite one another, although other configurations are possible, depending on the user's needs. The electrodes are separated, in certain configurations by a porous material, such as a polymer. Suitable polymers include those polymers characterized as being chemically inert, ionically conductive, electrically nonconductive, or any combination thereof.

Energy storage devices according to the present invention include one or more electrical connections to one or more electrical devices. Such devices include heaters, coolers, computers, portable devices, stationary devices, displays, batteries, fuel cells, turbines, and the like. Energy storage devices according to the present invention may be used singly or multiply, depending on the needs of the user. Energy storage devices according to the present invention may be integrated into electrical devices or may be separately connected to such devices, depending on the user's needs or design constraints.

In another aspect, the present invention provides methods for fabricating supercapacitors. The disclosed methods include contacting a nanoporous composition comprising a plurality of nanopores with a plurality of ions, where the difference between the average characteristic cross-sectional dimension of the nanopores and the average cross-sectional dimension of the plurality of ions being less than about 0.05 nm. Ions are suitably chosen such that at least one ion is capable of residing at least partially within one or more pores of the nanoporous composition.

The contacting preferably includes application of an electric charge or potential so as to give rise to one or more ions migrating at least partially into one or more pores of the nanoporous composition. The magnitude of such a charge will be dictated by the user's needs and will be apparent to those of ordinary skill in the art. In some embodiments, the migrating of the one or more ions gives rise to essentially overall electrical neutrality.

The ions may be contacted with the nanoporous composition by immersing, spraying, flowing, pouring, dipping, coating, painting, or any combination thereof. Other methods of effecting contact between the ions and the composition will be known to those of ordinary skill in the art.

As described elsewhere herein, the plurality of ions may comprise an electrolyte or an ionic liquid. Suitable electrolytes and ionic liquids will be known to those of ordinary skill in the art.

Pores suitable for the claimed method are characterized as having an average cross-sectional dimension in the range of from about 0.1 nm to about 3 nm. Ions suitable for the claimed method are also characterized as having an average cross-sectional dimension in the range of from about 0.1 nm to about 3 nm.

The nanoporous composition is suitably bound to as to give rise to a cohesive material. Such cohesive materials are suitably disposed onto at least one current collector or conductor. Such conductors are preferably capable of acting as electrodes. In some configurations, the nanoporous composition is disposed adjacent to the one or more electrodes prior to contacting the nanoporous composition with the plurality of ions. In other embodiments, the nanoporous composition is disposed adjacent to the one or more electrodes after contacting the nanoporous composition with the plurality of ions.

In some embodiments, one or more of the electrodes is charged. The electrodes are suitably positioned opposite one another. Other configurations and geometries of electrodes will be apparent to those of ordinary skill in the art.

Contacting the ions to the nanoporous material is preferably performed under such conditions that at least one ion resides partially within a pore of a charged electrode. This may be accomplished, for example, by charging one or more electrodes such that one or more ions migrate toward, and preferably at least partially into, a pore or pores of the nanoporous composition. The electrical and other environmental conditions capable of effecting such a migration will be known to those of ordinary skill in the art.

Supercapacitors made according to the disclosed methods are also within the scope of the present invention.

EXAMPLES AND OTHER ILLUSTRATIVE EMBODIMENTS

The following are non-limiting examples and embodiments that are representative only and do not necessarily restrict the scope of the present invention.

Electrochemical characterizations of CDC electrodes were conducted at 60° C. in Ethyl-MethylImmidazolium-TriFluoro-methane-Sulfonyllmide ionic liquid (EMI-TFSI). Ion sizes were calculated as about 0.79 nm and about 0.76 nm in the longest dimension for TFSI and EMI ions respectively. The EMI-TFSI ion sizes are within the range of the CDC pore size. Moreover, the anion and cation sizes are approximately equal. Without being bound by any particular theory of operation, this size approximation assumes that the same pore size is required for carbon anode and cathode. Cyclic voltammetry (about 20 mV/s) and galvanostatic experiments (from about 5 up to about 100 mA/cm$^2$) were conducted between about 0 and about 3 V in 2-electrode cells. No Faradic effects, and reproducible behavior have been observed, as shown in FIG. 1.

Figure 2:
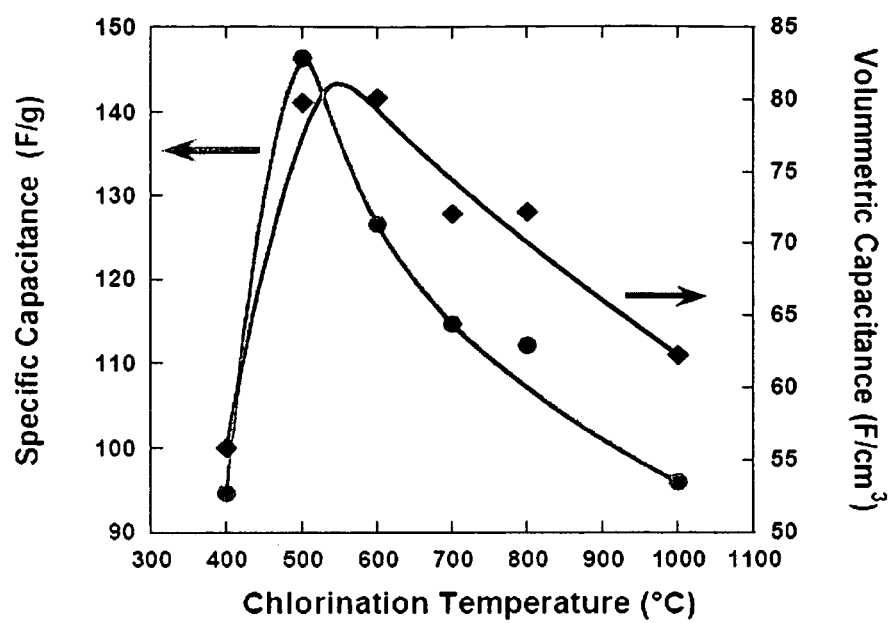
FIG. 2 illustrates specific gravimetric (F/g) and volumetric (F/cm$^3$) capacitances change versus the chlorination temperature for CDC electrodes tested in neat EMI-TFSI electrolyte at 60° C.—standard activated carbons reach 90 F/g and 45 F/cm$^3$ under the same experimental conditions.

FIG. 2 shows the change of the CDC specific capacitance (F/g) versus the chlorination temperature, calculated from the galvanostatic experiment at about 5 mA/cm$^2$. It is also emphasized that capacitance values of such CDCs were more than about 140 F/g and about 80 F/cm$^3$, while standard activated carbons with large and broader pore size distributions are known to present capacitance values lower than about 100 F/g and about 50 F/cm$^3$ in ionic liquids under the same or similar testing conditions. M. Lazzzari, M. Mastragostino and F. Soavi, Electrochem. Comm., 2007, 9, 1567-1572; C. O. Ania, J. Pernak, F. Stefaniak, E. Raymundo-Pinero, F. Beguin, Carbon, 2006, 44, 3126-3130; A. Balducci, R. Dugas, P. L. Taberna, P. Simon, D. Plée, M. Mastragostino and S. Passerini, J. Power Sources, 2007, 165, 2, 922-927; R. Chen, F., Wu, L. Li, B. Xu, X. Qiu, S. Chen, J. Phys. Chem. C., 2007, 111, 5184-5194; H. Zhang, G. Cao, Y. Yang, Z. Gu, Carbon, 2007, published online doi: 10.1016/j.carbon.2007.10.023; R. Chen, F., Wu, L. Li, X. Qiu, S. Chen, J. Electrochem. Soc. 2007, 154, A703-A708.

Improvements in capacity of the supercapacitors and materials of the present invention were confirmed by conducting comparative measurements on a commercially-available activated carbon from Kuraray. Compared to values of about 140 F/g and about 80 F/cm$^3$ obtained using experimental samples of the instant invention, the commercial samples only resulted in values of about 91 F/g and about 45 F/cm$^3$ under the same conditions. The better performance of the supercapacitors and materials of the present invention highlight the importance of controlling the pore size of porous materials in the sub-nanometer range for using ionic liquids in EDLCs.

The significant decrease in both specific and volumetric capacitance for samples prepared at about 400° C. highlights the pore size limitation that may arise. Without being bound by any particular theory of operation, it is believed that this capacitance loss arises from a carbon pore size that might be too small for ion accessibility. In other words, as the average pore size is reduced to below about 0.68 nm, there is an increased portion of pores that is not accessed by the electrolyte ions.

Figure 3:
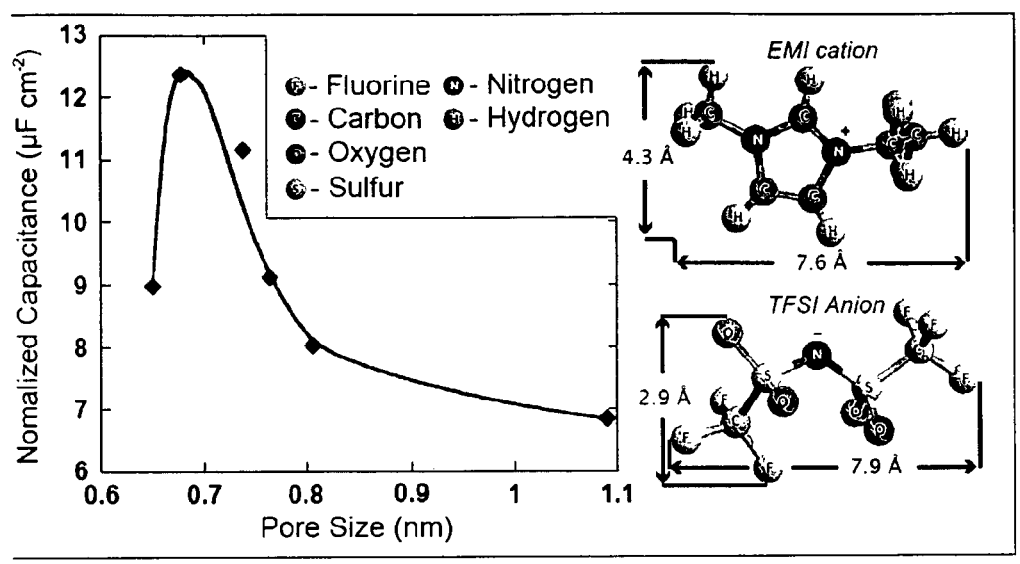
FIG. 3 illustrates the normalized capacitance change versus the pore size of the CDC samples prepared at different temperatures—normalized capacitance was obtained by dividing the specific capacitance by the SSA, and HYPERCHEM™ models of the structure of EMI and TFSI ions show a size correlation.
Figure 4:
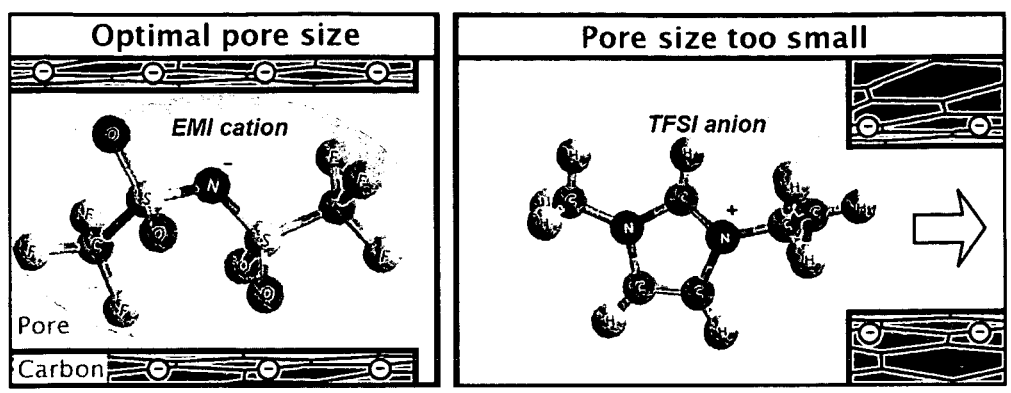
FIG. 4 depicts schematic views of ions attempting to enter both optimally-sized pores and sub-optimally sized pores.
Figure 5:
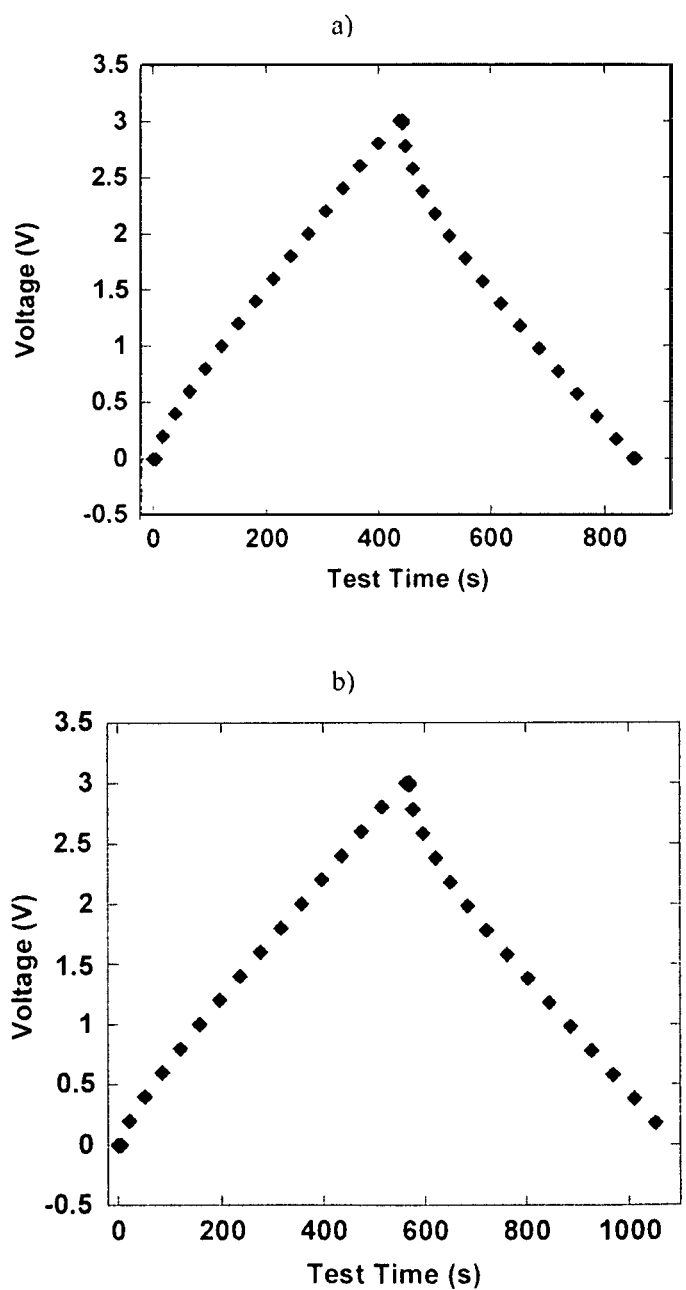
FIG. 5 depicts voltage versus time plots from galvanostatic measurements of (a) TiC-CDC 400° C. and (b) TiC-CDC 500° C. samples cycled from 0 V to 3 V at 5 mA/cm$^2$ (electrolyte: EMI-TFSI at 60° C.)—for all TiC-CDC samples, voltage versus time plots are linear, showing their capacitive behavior.

To better understand the relation between pore and ion size, the normalized capacitance (μF/cm$^2$) is also plotted versus the CDC pore size, as shown in FIG. 3. Results presented in FIG. 3 show the pore size effect. When pore size was decreased from about 1.1 to about 0.7 nm, normalized capacitance increased; a maximum was reached at about 0.7 nm, and a large specific capacitance decrease was observed at below about 0.7 nm. Without being bound by any particular theory of operation, it is believed that these results cast doubt on the way charge storage is traditionally described in EDLC materials, with ions being adsorbed on both pore walls: CDC pore size is in the same range as the ion size and there is no space available for more than one ion per pore. The maximum capacitance attained at a pore size of about 0.7 nm agrees well with the ion size, taking into account the asymmetry of the ions and accuracy of pore size measurements based on the slit pore model. Under those conditions, pore size is substantially similar to the ion size and ion adsorption was most efficiently achieved. When pore size is increased, the average distance between pore wall and the center of the ion (d) increases and then the capacitance for pores larger than around about 0.7 nm decreases according to:

$$C = \in A/d$$

where A is the surface area, d—separation between carbon and ions and $\in$—dielectric constant of the electrolyte. If the pores become even 50% larger than the optimum pore size (e.g., 1.1 versus 0.68 nm), there is still room for just one ion per pore, which should be oriented along the longest dimension of the pore, naturally leading to a lower volumetric capacitance. When the pore size is decreased below 0.68 nm, it is hypothesized that there is increasingly less space available for double layer charging because ions cannot get into the smallest pores, and as a consequence the capacitance is decreased.

For experimental use, Titanium Carbide Derived Carbon (TiC-CDC) powders were produced by chlorination of TiC powder (Atlantic Equipment Engineers, particle size 2 μm). Pristine material was placed in a horizontal furnace and heated at temperatures between 400° C. and 1000° C. under chlorine gas flow (10-15 cm$^3$/min) for 3 hours. TiC-CDC powders were then annealed at 600° C. for 2 hours under hydrogen gas flow to remove residual chlorine and chloride trapped in pores.

Argon sorption was conducted from relative pressure P/P$_0$ of 10$^{-6}$ to 1 to assess porosity and surface area data. Porosity analysis was performed with Ar and N$_2$ at liquid nitrogen temperature, −195.8° C., and with CO$_2$ at 0° C., on samples outgassed for at least 12 hrs at 300° C. using a Quantachrome Autosorb-1. The outgassing protocol used was sufficient to remove condensed water and vapors. J. Rouquerol et al., Pure & Appl. Chem. 1994, 66, 1739.

Isotherms showed increasing pore volume with increasing synthesis temperature. All isotherms are type I, which suggested that the CDC was microporous according to the IUPAC classification. At 1000° C. chlorination temperature, there was a slight hysteresis, showing a small amount of mesoporosity. Pore size distributions—reported in Table 1—were calculated from Ar adsorption data using the nonlocal density functional theory (NLDFT) method, P. I. Ravikovitch, A. Neimark, Colloid. Surface. A. 2001, 187-188, 11, for slit shaped pores provided by Quantachrome data reduction software (version 1.2), and the SSA was calculated using the Brunauer, Emmet, Teller (BET) method. N$_2$ sorption was used to ensure that samples did not have large mesopores, not shown by Ar sorption, and CO$_2$ sorption was done to ensure that there is no significant volume of micropores, that is not accessible by Ar. Because the difference between Ar, $N_2$ and $CO_2$ pore volumes was minimal, only the Ar results were are shown in this application.

Experimental values included in Table 1 were measured on the same batch of CDC that was used for electrochemical measurements in this work, so as to provide the highest accuracy and eliminates any possibility that uncontrolled deviations in the synthesis process affected electrochemical data.

A commercial microporous activated carbon YP 17 from Kuraray, Japan, was also used, which carbon is known to be well-suited for use with organic electrolytes. This commercial composition has a SSA of about 1709 $m^2/g$, a pore volume of about 0.877 $cm^3/g$ and less than about 55% of pore volume is within pores that are themselves within the approximately 1 to 1.265 nm range, according to data supplied by the manufacturer. Because the commercial composition has a SSA and pore volume that exceed those of all CDC samples tested (Table 1), it was expected that the commercial composition would demonstrate a comparatively higher capacitance, if total pore volume and/or SSA were determining the capacitance of the carbon. As described, however, experimental results with the instant invention were, unexpectedly, not directly correlated with SSA and pore volume, but correlated instead with the difference between ion size and pore size.

Electrochemical characterization of TiC-CDC samples was performed by assembling 4 $cm^2$ supercapacitor cells in a glove box under argon atmosphere ($O_2$ and $H_2O$ content less than 1 ppm). Active material films were made of 95 wt % of TiC-CDC and 5 wt % of PTFE (E. I. Dupont de Nemours). Electrodes having 15 $mg/cm^2$ active material film laminated on treated aluminium current collector were separated by an about 50 μm thick porous polymeric separator (see C. Portet, et al., Electrochim. Acta. 2004, 49, 905; C. Portet, et al., Journal of the Electrochemical Society, 2006, 153, A649-A653). Resulting stacks were kept under pressure by PTFE plates and stainless steel clamps (5 $kg/cm^2$). Stacks were then immersed into ionic liquid electrolyte (1-Ethyl-3-methylimidazolium bis(trifluoromethanesulfonyl)imide (EMI-TFSI), $H_2O$ at less than about 50 ppm, Solvionic). Assembled cells were kept under argon atmosphere in an airtight box during the whole electrochemical characterizations.

Electrochemical Impedance Spectroscopy (EIS) and Cyclic Voltammetry measurements were performed using a VMP3 potentiostat (BioLogic, Claix, France). EIS was performed on 2-electrode cells at a DC bias of 0 V by applying an approximately 10 mV RMS sine wave at frequencies from about 50 kHz to about 10 mHz. Cyclic Voltammetry was performed on 2-electrode cells according to the methods of P. L. Taberna, et al., *Journal of the Electrochemical Society*, 2003, 150, A292-A300. A potential scan from about 0 V to 3 V at 20 mV/s was imposed to the cell. Current response of the cell was recorded.

Galvanostatic cycling was performed with an Arbin BT2000 instrument. 2-electrode cells were cycled from about 0 V to about 3 V at constant current densities from about 5 $mA/cm^2$ to about 100 $mA/cm^2$ (FIG. 1S). Capacitance is calculated from the slope of the discharge plots E=f(t) from equation:

$$C = \frac{I}{\left(\frac{dV}{dt}\right)} \quad (1)$$

where C is the cell capacitance in Farad (F), I the discharge current in Ampere (A) and dV/dt the slope of the discharge curve in Volts per second (V/s).

Specific capacitance $C_{m_{AM}}$ in Farad per gram of CDC (F/g) was related to the capacitance of the cell, C, by:

$$C_{m_{AM}} = \frac{2C}{m_{AM}}, \quad (2)$$

where $m_{AM}$ is the weight of CDC (g) per electrode, i.e. 57 mg. The maximum deviation in gravimetric capacitance between cells assembled with the same active material was less than about 5%. Values given were calculated at about 5 $mA/cm^2$. Similarly, the volumetric capacitance was calculated from equation:

$$C_{V,AM} = \frac{2C}{V_{AM}}, \quad (3)$$

where $V_{AM}$ is the volume of the active material layer, which changes with samples. Due to slightly non-uniform electrode thickness, the maximum variation in volumetric capacitance was slightly higher than the gravimetric case, about 6%.

TABLE 1

| Chlorination temperature (° C.) | BET SSA ($m^2/g$) | Pore Volume (cc/g) | Pore size (nm) | Maximum pore size* (nm) |
|---|---|---|---|---|
| 400 | 1113 | 0.51 | 0.65 | 1.12 |
| 500 | 1140 | 0.50 | 0.68 | 1.18 |
| 600 | 1269 | 0.60 | 0.74 | 1.23 |
| 700 | 1401 | 0.66 | 0.76 | 1.41 |
| 800 | 1595 | 0.79 | 0.81 | 1.54 |
| 1000 | 1625 | 0.81 | 1.10 | 2.80 |

What is claimed:

1. A composition, comprising:
    a nanoporous material and an ionic liquid,
    the ionic liquid comprising a plurality of ions,
    the nanoporous material being characterized as comprising a plurality of nanopores having an average characteristic cross-sectional dimension in the range of from about 0.1 nm to about 3 nm, and
    the difference between the average characteristic cross-sectional dimension of the nanopores and the average cross-sectional dimension of the plurality of ions being in the range of less than about 0.05 nm.

2. The composition of claim 1, wherein the nanoporous material is capable of functioning as an electrode.

3. The composition of claim 2, wherein the nanoporous material comprises a unimodal distribution of pore size.

4. The composition of claim 3, wherein the nanoporous material comprises a multimodal distribution of pore size.

5. The composition of claim 1, wherein the plurality of ions are capable of remaining stable when subjected to a voltage.

6. The composition of claim 1, wherein the ionic liquid comprises cations of ethylmethylimmidazolium, tetraalkylammonium, dialkylimidazolium, trialkylimidazolium, tetraalkylimidazolium, alkylpyridinium, dialkylpyrrolidinium, dialkylpiperidinium, tetraalkylphosphonium, trialkylsulfonium, or a combination thereof.

7. The composition of claim 1, wherein the ionic liquid comprises an anion of $BF_4$, $B(CN)_4$, n-$C_3F_7BF_3$, $CH_3BF_3$, $CH_2CHBF_3$, $CF_3BF_3$, $C_2F_5BF_3$, n-$C_4F_9BF_3$, $PF_6$, $CF_3CO_2$, $CF_3SO_3$, $N(SO_2CF_3)_2$, $N(COCF_3)(SO_2CF_3)$, $N(SO_2F)_2N(CN)_2$, $C(CN)_3$, SCN, SeCN, $CuCl_2$, $AlCl_4$, spyro-bipyrrolidinium, or a combination thereof.

8. The composition of claim 1, wherein the ionic liquid comprises Ethyl-Methyl Immidazolium-Trifluoromethane-Sulfonyl Imide.

9. The composition of claim 1, wherein the plurality of ions comprises two or more species of ion.

10. The composition of claim 1, wherein the plurality of ions comprises an average cross-sectional dimension in the range of from about 0.1 nm to about 3 nm.

11. The composition of claim 1, wherein the nanoporous material comprises carbon.

12. The composition of claim 1, wherein the nanoporous material comprises a carbide-derived carbon.

13. The composition of claim 12, wherein the nanoporous material comprises a titanium-carbon carbide derived carbon.

14. The composition of claim 1, wherein the nanoporous material is characterized as being substantially free of halogens.

15. The composition of claim 1, wherein the plurality of nanopores is characterized as having an average cross-sectional dimension in the range of from about 0.2 nm and about 2.5 nm.

16. The composition of claim 1, wherein the plurality of nanopores is characterized as having an average cross-sectional dimension in the range of from about 0.5 nm and about 2.0 nm.

17. The composition of claim 1, wherein the plurality of nanopores is characterized as having an average cross-sectional dimension in the range of from about 0.7 nm and about 1.0 nm.

18. The composition of claim 1, wherein the nanoporous material a specific surface area, as determined by the Brunauer Emmett Teller method, in the range of from about 800 $m^2/g$ to about 3000 $m^2/g$.

19. The composition of claim 1, wherein the nanoporous material comprises a specific surface area, as determined by the Brunauer Emmett Teller method, in the range of from about 1000 $m^2/g$ to about 2000 $m^2/g$.

20. The composition of claim 1, wherein the nanoporous material comprises an average pore volume in the range of from about 0.4 cc/g to about 0.9 cc/g.

21. The composition of claim 1, wherein the difference between the average characteristic cross-sectional dimension of the nanopores and the average cross-sectional dimension of the plurality of ions being less than about 0.03 nm.

22. The composition of claim 1, wherein the composition is characterized as having a normalized capacitance of greater than about 6 $\mu F/cm^2$.

23. The composition of claim 1, wherein the composition is characterized as having a normalized capacitance of greater than about 8 $\mu F/cm^2$.

24. The composition of claim 1, wherein the composition is characterized as having a normalized capacitance of greater than about 12 $\mu F/cm^2$.

25. The composition of claim 1, wherein the composition is characterized as having a specific capacitance of greater than about 90 F/g.

26. The composition of claim 1, further comprising a binder capable of fixing the composition into a cohesive form.

27. The composition of claim 26, wherein the binder comprises an adhesive, a polymer, or any combination thereof.

28. The composition of claim 1, wherein one or more of the plurality of ions is characterized as residing at least partially within one or more pores of the composition.

29. An energy storage device, comprising:
a composition disposed between one or more electrodes, the composition comprising a nanoporous material and an ionic liquid, the ionic liquid comprising a plurality of ions,
the nanoporous material characterized as having a plurality of nanopores having an average characteristic cross-sectional dimension in the range of from about 0.1 nm to about 3 nm, and
the average characteristic cross-sectional dimension of the nanopores being within about 0.05 nm of the average cross-sectional dimension of the plurality of ions.

30. The energy storage device of claim 29, wherein the composition comprises carbon, a carbide-derived carbon, or any combination thereof.

31. The energy storage device of claim 29, wherein the plurality of pores is characterized as having an average cross-sectional dimension in the range of from about 0.1 nm to about 3 nm.

32. The energy storage device of claim 29, wherein the composition further comprises a binder.

33. The energy storage device of claim 32, wherein the binder is capable of maintaining the nanoporous material in a cohesive form.

34. The energy storage device of claim 32, wherein the binder comprises an adhesive, a polymer, or any combination thereof.

35. The energy storage device of claim 29, wherein the binder is characterized as being essentially electrochemically inert.

36. The energy storage device of claim 29, wherein the binder is characterized as being essentially insoluble in the ionic liquid.

37. The energy storage device of claim 34, wherein the polymer comprises polytetrafluoroethylene, polyvinylidene fluoride, or any combination thereof.

38. The energy storage device of claim 29, wherein the plurality of ions comprises cations of ethylmethylimmidazolium, tetraalkylammonium, di alkylimidazolium, trialkylimidazolium, tetraalkylimidazolium, alkylpyridinium, dialkylpyrrolidinium, dialkylpiperidinium, tetraalkylphosphonium, trialkylsulfonium, and anions of: $BF_4$, $B(CN)_4$, $n-C_3F_7BF_3$, $CH_3BF_3$, $CH_2CHBF_3$, $CF_3BF_3$, $C_2F_5BF_3$, $n-C_4F_9BF_3$, $PF_6$, $CF_3CO_2$, $CF_3SO_3$, $N(SO_2CF_3)_2$, $N(COCF_3)(SO_2CF_3)$, $N(SO_2F)_2N(CN)_2$, $C(CN)_3$, SCN, SeCN, $CuCl_2$, $AlCl_4$, spyro-bipyrrolidinium, or a combination thereof.

39. The energy storage device of claim 29, wherein the energy storage device comprises at least two electrodes.

40. The energy storage device of claim 29, wherein at least one of the plurality of ions resides at least partially within a pore of the nanoporous composition.

41. The energy storage device of claim 40, wherein the at least two electrodes are separated by a porous material.

42. The energy storage device of claim 41, wherein the porous material comprises a polymer.

43. The energy storage device of claim 42, wherein the polymer is characterized as chemically inert, ionically conductive, electrically nonconductive, or any combination thereof.

44. The energy storage device of claim 29, further comprising an electrical connection to an electrical device.

45. The energy storage device of claim 29, wherein the electrical device comprises a heater, a cooler, a computer, a portable device, a stationary device, a display, battery, fuel cell, turbine or any combination thereof.

46. A method for fabricating a supercapacitor, comprising:
contacting a nanoporous composition comprising a plurality of nanopores with an ionic liquid comprising a plurality of ions,
the difference between the average characteristic cross-sectional dimension of the nanopores and the average cross-sectional dimension of the plurality of ions being less than about 0.05 nm,
the ions being chosen such that at least one ion is capable of residing at least partially within one or more pores of the nanoporous composition.

47. The method of claim 46, wherein the contacting comprises applying an electric charge so as to give rise to one or more ions migrating at least partially into one or more pores of the nanoporous composition.

48. The method of claim 47, wherein the migrating of the one or more ions gives rise to essentially overall electrical neutrality.

49. The method of claim 46, wherein the contacting comprises immersing, spraying, flowing, pouring, dipping, coating, painting, or any combination thereof.

50. The method of claim 46, wherein the plurality of pores comprises an average cross-sectional dimension in the range of from about 0.1 nm to about 3 nm.

51. The method of claim 46, wherein the plurality of ions comprises an average cross-sectional dimension in the range of from about 0.1 nm to about 3 nm.

52. The method of claim 46, further comprising binding the nanoporous composition so as to give rise to a cohesive material.

53. The method of claim 52, further comprising disposing the bound nanoporous composition onto at least one current collector.

54. The method of claim 53, further comprising disposing the nanoporous composition adjacent to one or more electrodes.

55. The method of claim 54, wherein the nanoporous composition is disposed adjacent to the one or more electrodes prior to contacting the nanoporous composition with the plurality of ions.

56. The method of claim 54, wherein the nanoporous composition is disposed adjacent to the one or more electrodes after contacting the nanoporous composition with the plurality of ions.

57. The method of claim 54, wherein one or more of the electrodes are charged.

58. The method of claim 54, wherein one or more of the electrodes are positioned essentially opposite one another.

59. The method of claim 58, further comprising disposing the plurality of ions such that at least one ion resides partially within a pore of a charged electrode.

60. A supercapacitor made according to the method of claim 46.

* * * * *

UNITED STATES PATENT AND TRADEMARK OFFICE
CERTIFICATE OF CORRECTION

PATENT NO.       : 8,498,097 B2                                        Page 1 of 1
APPLICATION NO.  : 12/864774
DATED            : July 30, 2013
INVENTOR(S)      : Gogotsi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 242 days.

Signed and Sealed this

Fifteenth Day of September, 2015

Michelle K. Lee
*Director of the United States Patent and Trademark Office*